Dec. 19, 1939.  T. H. STANCLIFF  2,184,129
DRILLING BIT
Filed March 20, 1939  2 Sheets-Sheet 1

Inventor
T. H. STANCLIFF.
By J. Vincent Martin
and
Ralph R. Browning.
Attorneys

Dec. 19, 1939.  T. H. STANCLIFF  2,184,129
DRILLING BIT
Filed March 20, 1939  2 Sheets-Sheet 2

Inventor
T. H. STANCLIFF.
By J. Vincent Martin
and Ralph R. Browning
Attorneys

Patented Dec. 19, 1939

2,184,129

UNITED STATES PATENT OFFICE 2,184,129

DRILLING BIT

Thomas H. Stancliff, Houston, Tex., assignor to Reed Roller Bit Company, Houston, Tex., a corporation of Texas Application March 20, 1939, Serial No. 262,901

12 Claims. (Cl. 255—71)

This invention relates to drilling bits.

The general object of this invention is to provide a roller cutter for a drilling bit with radial and thrust bearings, such that the life and effectiveness of the thrust bearings will be greatly increased.

The invention is illustrated in connection with the side cutters of the cross roller bit. These cutters are adapted to cut at the sides and bottom of the hole along an annular path and receive a great variety of enormous stresses in both radial and axial directions with respect to the axis of the cutter. In one common arrangement these cutters are provided wth internal roller bearings which extend along a substantial portion of the length of the cutter to take the radial load, together with a ball bearing usually very close to one end of the cutter adapted to take the thrust load. In such an arrangement, a slight wearing of the roller bearing or either of its races, or an excessive radial stress on that end portion of the cutter in which the ball bearing is mounted causes a very high radial load to be placed on the ball bearing which is intended to take only thrust loads. The ball bearings have been found to be unsuitable for taking such extreme radial loads and the consequence is that they will break down and the bearing structure of the cutter thereafter rapidly deteriorates.

It is a more specific object of this invention, therefore, to provide a means whereby all radial load upon such a cutter will be taken by radial bearings and will be prevented from being exerted upon those bearings adapted to take thrust only.

Another object of this invention is, therefore, to lengthen the life of the bearings of side roller cutters for drilling bits.

Other objects and advantages of this invention will become apparent from the following description taken in connection with the accompanying drawings, wherein are set forth by way of illustration and example certain embodiments of this invention.

Figure 1:
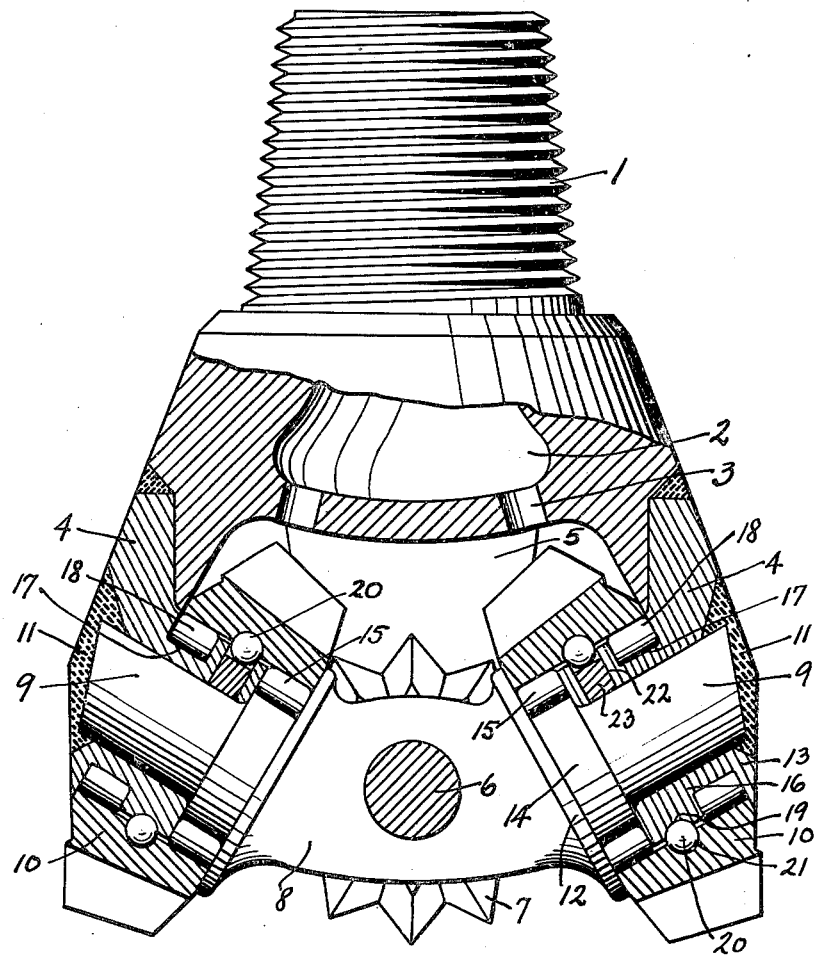
Fig. 1 is a vertical cross section through a cross roller bit constructed in accordance with this invention.

The drilling bit shown in Fig. 1 is provided with the usual threaded pin portion 1 adapted to be connected to a drill stem and having a slush passageway 2 therein terminating in openings 3 so placed as to direct the flow of flushing fluid onto the rolling cutters. The body portion of this bit is also provided with downwardly extending legs 4 and 5, respectively, the legs 5 being adapted to receive the outer end portions of a pin 6 on which cross roller cutters 7 are rotatably mounted. The central portion of the pin 6 is supported by a bridge member 8 having outwardly and upwardly extending parts 9 forming spindles or axes for side roller cutters 10. The outer end portions of the spindles 9 are welded to the legs 4 as shown at 11. The legs 4 are welded to the head. The side cutters 10 are confined between flanges 12 on the bridge and the inner walls 13 of the legs 4. In this particular instance, the spindle 9 is formed with a roller raceway 14 adjacent the flange 12 for the purpose of receiving the roller bearing 15. A bushing 16 integral with the leg 4 surrounds the remainder of this spindle and the exterior of this bushing is provided with a raceway 17 at the end thereof opposite the raceway 14, this raceway 17 being adapted to receive a roller bearing 18. Between the roller bearing races 14 and 17 the bushing 16 is provided with an annular groove 19 adapted to form a race for a ball bearing 20. The interior of the cutter 10 is substantially cylindrical except that it is provided with a groove 21 adapted to form a raceway for the balls 20 complementary to the raceway 19 in the bushing 16. The bushing 16 is provided with a radial opening 22 at the uppermost portion of its circumference, said opening being of a size sufficient to pass the balls 20 and intersecting the groove 19 forming a raceway for those balls. The opening 22 is normally closed by means of a plug 23.

In assembling, the bearings 15 are first placed in position around the spindle 9 on their raceways 14. The bushings 16 are then placed within the side cutters 10 and the balls 20 inserted through the openings 22. Plugs 23 are then put in these openings and the bushings and cutters placed over the spindles 9, after which the bearings 18 may be placed in position. The cross cutter shaft 6 is put in position and the cross cutters 7 mounted thereon. The entire assembly is then placed in proper position with respect to the bit head and welded in place as illustrated.

In operation, it will be seen that since the thrust bearings 20 are placed between two radial roller bearings 15 and 18, these thrust bearings can take no substantial radial load. All such radial load will be taken by one or the other or both of the radial bearings 15 and 18. The thrust bearing 20 will, therefore, not be unduly worn or loaded and will last a great deal longer time. Any twisting or angular load placed on these cutters will have their radial components entirely taken by the roller bearings 15 and 18 as they should be, because no radial load can be exerted on the bearings 20. The bearings 20 on the other hand, will take all of the thrust load because, except for the raceway 21, the interior of the cutter is of cylindrical form and can hence slide along its axis without in any way affecting the roller bearings 15 and 18. All change of injuring the thrust bearing by excessive radial overloads is thus eliminated.

Figure 2:
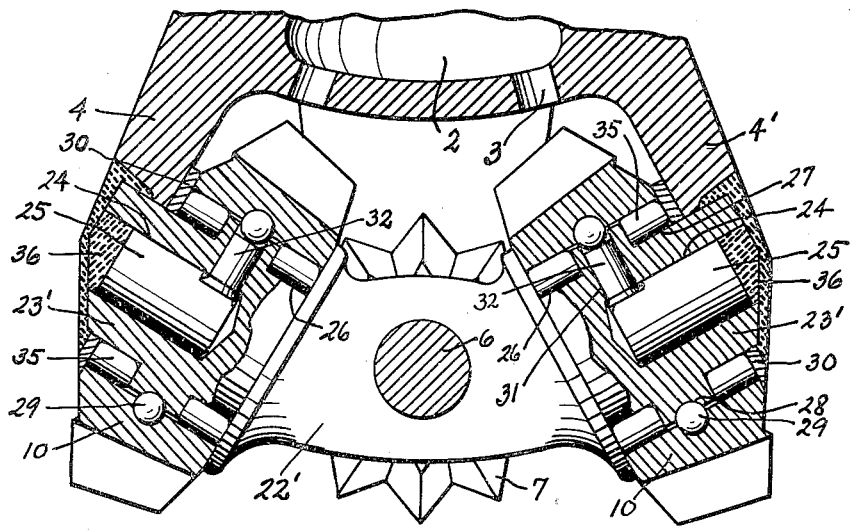
Fig. 2 is a similar view showing a slight modification.

In the form shown in Fig. 2, the bit head and the various parts thereof are identical with those shown in Fig. 1 except that the legs 4' are integral with the head and the bushings 16 are omitted. In this figure, however the bridge 22' is provided wtih spindle portions 23' having hollow ends 24 adapted to receive pins or plugs 25. These spindles 23' are also provided each with a plurality of radial raceways 26 and 27 and between these raceways with an annular groove, forming raceways 28 for the balls 29. The cutter 10 is identical in all respects with that previously described. In this form, as in the previously described form a thrust ring 30 may, if desired, be placed between the outer end of the cutter 10 and the inner wall of the arm 4.

In assembling, the assembly is as heretofore described except that after the bearings 26 have been placed on the spindles 23' the cutters 10 are immediately put in position on these spindles. The balls 29 are then dropped in through the openings 31 leading from the hollow interiors 24 of the spindles to the raceways 28. After these balls have been dropped in plugs 32 are dropped into the openings 31 to close the same and plugs 25 are dropped into the openings 24 to hold the plugs 32 in place. The bearings 35 are then put in position and the device assembled with respect to the head. The parts are then welded in place as shown at 36.

It will be appreciated that in operation the device just described will function substantially the same as in the previously described construction.

Figure 3:
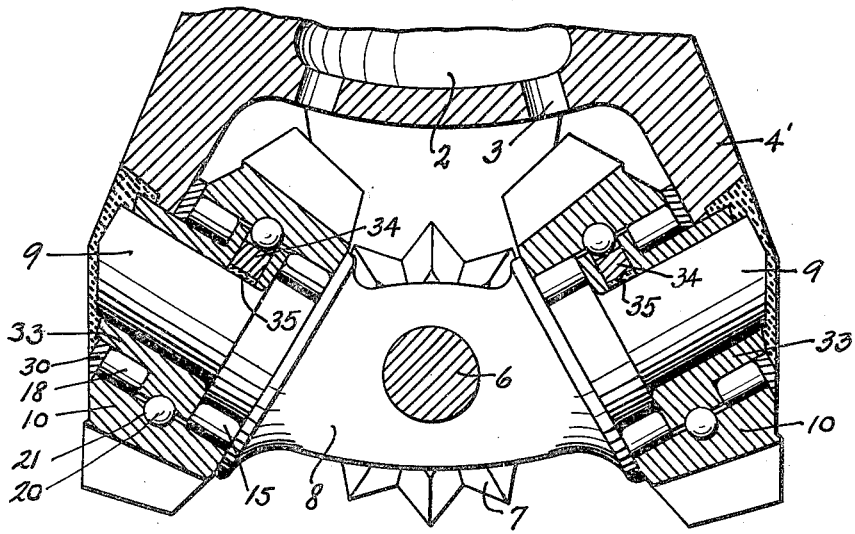
Fig. 3 is a view similar to Figs. 1 and 2 but showing a still further modification.

In Fig. 3, the structure is again much the same, being similar to that shown in Fig. 1. The bushings which are designated 33 are, however, slightly different being formed separately from the legs 4' and arranged to extend into the spaces within the legs 4', so that when the spindles are welded in place within these legs the bushings 33 will likewise be welded in place with respect to the legs and with respect to the spindles. The assembly is much the same except, however, that the plug 34 which serves to plug the opening through which the balls are inserted is preferably welded in place, as shown at 35.

The operation of this modification is likewise the same as in the previously described forms. It will readily be seen that in all the forms radial load will be taken not from one end only or from one end and a portion of the middle part of the cutter, but radial load will be taken from both ends of the cutter so as to protect the thrust bearings which are intermediate the ends of the cutter from having to take any radial load. The thrust bearings on the other hand will take all of the thrust load and none of this thrust load will be transmitted to the radial bearings because of the cylindrical formation of the insides of the side roller cutters.

It will further be noted that in each instance shown both radial bearings are of the same diameter. They will hence wear substantially the same, assuming that the load averages the same, and neither will have a tendency to let down the load on the thrust bearing because they are of substantially equal diameter and construction.

Having described my invention, I claim:

1. In a drill bit, a side roller cutter of annular formation, a downwardly and inwardly directed spindle for said cutter, an abutment at each of the opposite ends of said spindle for confining said cutter, said cutter being of substantially uniform inner diameter throughout except for a groove forming a ball thrust bearing raceway intermediate its ends, roller bearings interposed between said cutter and spindle on the opposite sides of said groove, said spindle having a corresponding grooved raceway adapted to register with the groove in said cutter, and balls within said complementary grooves adapted to take the end thrusts exerted upon said cutter.

2. In a drill bit, a side roller cutter, a downwardly and inwardly inclined spindle for rotatably mounting said cutter, abutments adjacent the opposite ends of said spindle for confining said cutter therebetween, a ball thrust bearing intermediate the ends of said cutter and between said cutter and said spindle for taking end thrusts exerted upon said cutter, and a pair of radial roller bearings of substantially equal diameter between said cutter and said spindle on opposite sides of said thrust bearing.

3. In a drill bit, a side roller cutter of annular formation, a downwardly and inwardly directed spindle for said cutter, an abutment at each of the opposite ends of said spindle for confining said cutter, said cutter having a groove forming a ball thrust bearing raceway intermediate its ends, roller bearings interposed between said cutter and spindle on the opposite sides of said groove, said spindle having a corresponding grooved raceway adapted to register with the groove in said cutter, and balls within said complementary grooves adapted to take the end thrusts exerted upon said cutter.

4. In a drill bit, a side roller cutter, a downwardly and inwardly inclined spindle for rotatably mounting said cutter, abutments adjacent the opposite ends of said spindle for confining said cutter therebetween, a ball thrust bearing intermediate the ends of said cutter and between said cutter and said spindle for taking end thrusts exerted upon said cutter, and a pair of radial roller bearings between said cutter and said spindle on opposite sides of said thrust bearing.

5. In a drill bit, a side roller cutter of annular formation, a downwardly and inwardly directed spindle for said cutter, said cutter being of substantially uniform diameter throughout except for a groove forming a ball thrust bearing raceway intermediate its ends, roller bearings interposed between said cutter and spindle on the opposite sides of said groove, said spindle having a corresponding grooved raceway adapted to register with the groove in said cutter, and balls within said complementary grooves and adapted to take the end thrusts exerted upon said cutter.

6. In a drill bit, a side roller cutter, a downwardly and inwardly inclined spindle for rotatably mounting said cutter, a ball thrust bearing intermediate the ends of said cutter and between said cutter and said spindle for taking end thrusts exerted upon said cutter, and a pair of radial roller bearings of substantially equal diameter between said cutter and said spindle on opposite sides of said thrust bearing.

7. In a drill bit, a head, a side roller cutter of annular formation, a downwardly and inwardly directed spindle for said cutter, an abutment at each of the opposite ends of said spindle for confining said cutter, said cutter being of substantially uniform inner diameter throughout except for a groove forming a ball thrust bearing raceway intermediate its ends, roller bearings interposed between said cutter and spindle on the opposite sides of said groove, said spindle having a corresponding grooved raceway adapted to register with the groove in said cutter, and balls within said complementary grooves and adapted to take the end thrusts exerted upon said cutter, said spindle comprising a solid part integrally secured to said head and extending through said cutter, and having a roller race and a part of reduced diameter between said race and the head, and a bushing on said part of reduced diameter and providing the other roller race and the ball race, said bushing having an opening from the interior thereof into said ball race through which said balls may be passed, and means for closing said opening.

8. In a drill bit, a head, a side roller cutter, a downwardly and inwardly inclined spindle on said head for rotatably mounting said cutter, abutments adjacent the opposite ends of said spindle for confining said cutter therebetween, a ball thrust bearing intermediate the ends of said cutter and between said cutter and said spindle for taking end thrusts exerted upon said cutter, and a pair of radial roller bearings of substantially equal diameter between said cutter and said spindle on opposite sides of said thrust bearing, said spindle comprising a solid part integrally secured to said head and extending through said cutter, and having a roller race and a part of reduced diameter between said race and the head, and a bushing on said part of reduced diameter and providing the other roller race and the ball race, said bushing having an opening from the interior thereof into said ball race through which said balls may be passed, and means for closing said opening.

9. In a drill bit, a head, a side roller cutter of annular formation, a downwardly and inwardly directed spindle for said cutter, an abutment at each of the opposite ends of said spindle for confining said cutter, said cutter being of substantially uniform inner diameter throughout except for a groove forming a ball thrust bearing raceway intermediate its ends, roller bearings interposed between said cutter and spindle on the opposite sides of said groove, said spindle having a corresponding grooved raceway adapted to register with the groove in said cutter, and balls within said complementary grooves and adapted to take the end thrusts exerted upon said cutter, said spindle comprising a solid part extending through said cutter and having a roller race and a part of reduced diameter between said race and the head, and a bushing on said part of reduced diameter and providing the other roller race and the ball race, said bushing having an opening from the interior thereof into said ball race through which said balls may be passed, and means for closing said opening, said solid part and said bushing being both integrally joined to said head.

10. In a drill bit, a head, a side roller cutter, a downwardly and inwardly inclined spindle on said head for rotatably mounting said cutter, abutments adjacent the opposite ends of said spindle for confining said cutter therebetween, a ball thrust bearing intermediate the ends of said cutter and between said cutter and said spindle for taking end thrusts exerted upon said cutter, and a pair of radial roller bearings of substantially equal diameter between said cutter and said spindle on opposite sides of said thrust bearing, said spindle comprising a single member having races for all of said bearing formed in its outer surface and being hollow from its outer end for a portion of its length and having a passageway extending from the interior of said hollow portion into communication with the race for said ball bearing through which the balls thereof may be passed, a plug closing said passageway, and means in said hollow portion to hold said plug in place, said last mentioned means and said single member being both integrally joined to said head.

11. In a drill bit, a head, a side roller cutter of annular formation, a downwardly and inwardly directed spindle for said cutter, an abutment at each of the opposite ends of said spindle for confining said cutter, said cutter being of substantially uniform inner diameter throughout except for a groove forming a ball thrust bearing raceway intermediate its ends, roller bearings interposed between said cutter and said spindle on the opposite sides of said groove, said spindle having a corresponding grooved raceway adapted to register with the groove in said cutter, and balls within said complementary grooves and adapted to take the end thrusts exerted upon said cutter, said spindle comprising a solid part extending through said cutter and having a roller race and a part of reduced diameter between said race and the head, and a bushing on said part of reduced diameter and providing the other roller race and the ball race, said bushing having an opening from the interior thereof into said ball race through which said balls may be passed, and means for closing said opening, said bushing having an upwardly extending lug thereon integrally joined to said head, and said solid part extending into said bushing and being integrally joined thereto.

12. In a drill bit, a side roller cutter, a downwardly and inwardly inclined spindle for rotatably mounting said cutter, abutments adjacent the opposite ends of said spindle for confining said cutter therebetween, a ball thrust bearing intermediate the ends of said cutter and between said cutter and said spindle for taking end thrusts exerted upon said cutter, and a pair of radial bearings between the cutter and said spindle on opposite sides of said thrust bearing.

THOMAS H. STANCLIFF.